United States Patent [19]

Vroonland

[11] Patent Number: 4,987,925

[45] Date of Patent: Jan. 29, 1991

[54] LOADING ARM WITH A LOCK-DOWN DEVICE

[75] Inventor: Evart J. Vroonland, Richardson, Tex.

[73] Assignee: LTV Energy Products, Houston, Tex.

[21] Appl. No.: 414,948

[22] Filed: Sep. 29, 1989

[51] Int. Cl.[5] .............. F16L 3/00

[52] U.S. Cl. .............. 137/615; 141/376

[58] Field of Search .............. 137/615; 141/279, 376

[56] References Cited

U.S. PATENT DOCUMENTS 2,727,534 12/1955 Briede .............. 137/615

3,489,174 1/1970 Cooley, Jr. .............. 137/615

*Primary Examiner*—John C. Fox

*Attorney, Agent, or Firm*—Arnold, White & Durkee

[57] ABSTRACT

This invention provides for a spring-balanced loading arm with a positive lock-down device use in a material handling system. It includes a swivel arm which is pivotally connected at one end to a support structure for swivel movement both in horizontal and vertical planes relative to the support structure. There is also provided an extendable lock-down device for positively locking the swivel arm. One end of the lock-down device is pivotally connected to the support structural and the other end is fixedly connected to the swivel arm. The lock-down device is adapted to be locked in position at several predetermined lengths. When the lock-down device is locked in a given position, it also positively locks the swivel arm and prevents any vertical movement of the loading arm.

16 Claims, 3 Drawing Sheets

FIG.2
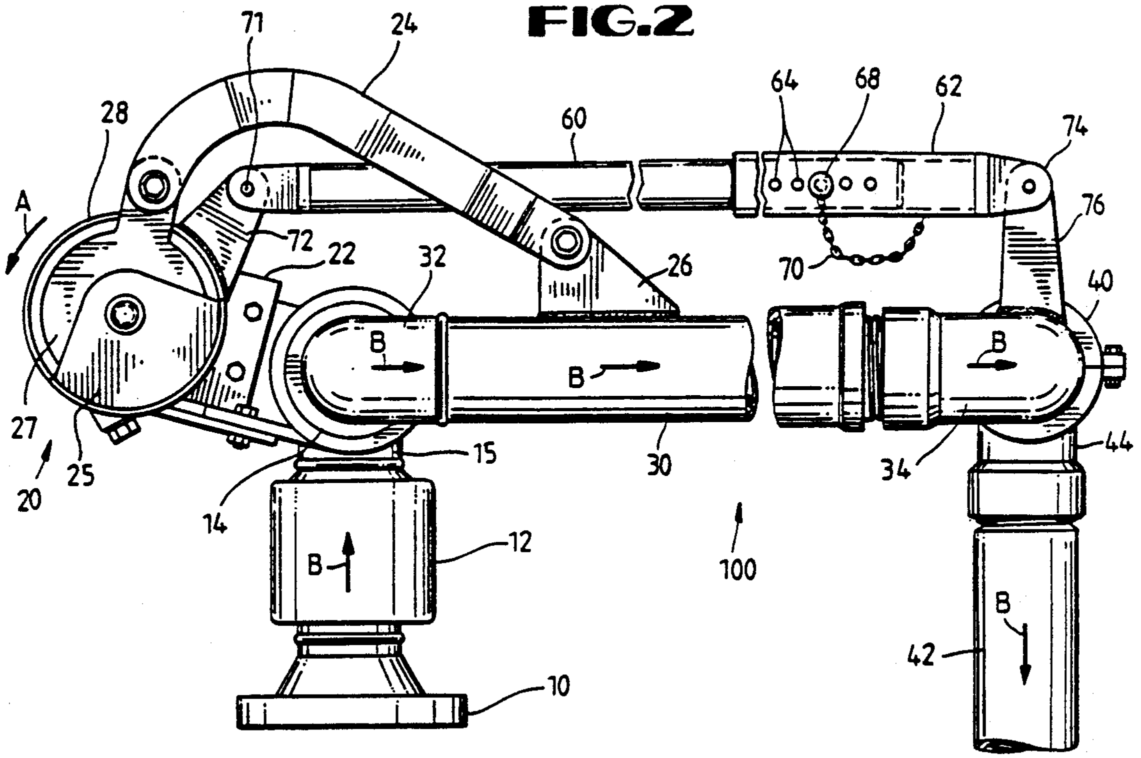
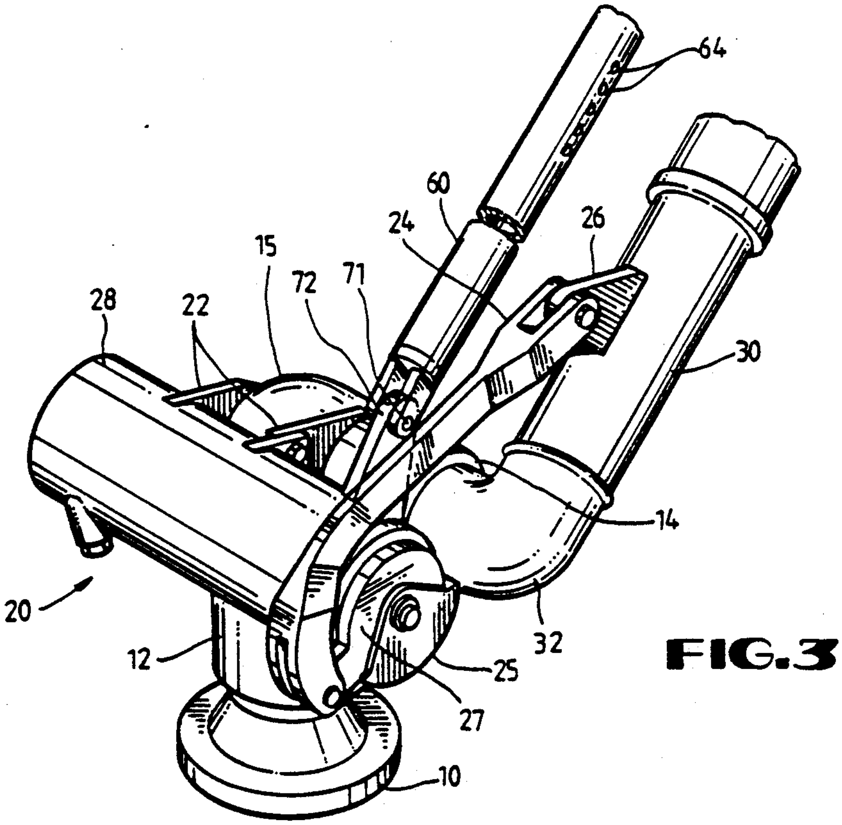
FIG.3

LOADING ARM WITH A LOCK-DOWN DEVICE

TECHNICAL FIELD

The present invention relates to a lock-down device for positively locking in a desired position swivelable arms, such as loading arms used for the transfer of both wet or dry materials to tank cars or trucks.

BACKGROUND OF THE INVENTION

Spring-balanced or weight-balanced loading arms are generally used for transferring wet or dry materials into tank cars or trucks. The spring-balanced loading arms shown in U.S. Pat. Nos. 3,244,440 issued to Albert A. Ashton et al. on Apr. 15, 1966 and U.S. Pat. No. 4,537,233 issued to Evart J. Vroonland on Aug. 27, 1985 are examples of loading arms which are currently in use. These loading arms have a tendency to rise out of the truck or tank car loading port during loading because of the force of the counterbalance spring or the counterbalance weight and the jet action of the material being discharged. For safety reasons, it is very desirable to lock the loading arm when it is used for transferring a material. Absent any locking mechanism, the loading arm will have an unwanted vertical and horizontal movement during loading operations. These movements are aggravated when the loading is being done into an open dome type tank car or truck.

In the past, locking devices have been used to lock down the loading arm at the riser end of the arm. However, these devices require the loading arm operator to move from his position at the loading port to the riser end to engage the locking device. Furthermore, these lock-down devices still permit a certain amount of movement of the loading arm at the port end.

The present invention provides a lock-down device which positively locks a loading arm into a given position during loading operations.

SUMMARY OF THE INVENTION

The invention provides for a loading arm which has a support structure, a spring assembly, and a swivel arm having a riser end and a port end. The riser end of the swivel arm is pivotally attached to the support structure for swivel movement in both the horizontal and vertical planes relative to the support structure. The spring assembly is connected to both the support structure and the swivel arm to provide balance to the swivel arm. The invention also includes an extendable lock-down structure which has a lower end and an upper end. The lower end of the lock-down device is pivotally connected to the spring assembly or the support structure while the upper end is fixedly connected to the port end of the swivel arm. The extendable lock-down device is adapted to be positively locked at several positions near the port end of the swivel arm.

These and other features of the present invention will become apparent with reference to the following detailed description of a preferred embodiment thereof in connection with the accompanying drawings wherein like reference numerals have been applied to like elements.

BRIEF DESCRIPTION OF THE DRAWINGS

FIG. 2 is a side elevational view of the embodiment shown in FIG. 1 when the loading arm is in the loading position.

FIG. 3 is a partial perspective view of the embodiment of FIG. 1.

DETAILED DESCRIPTION OF THE PREFERRED EMBODIMENT

Figure 1:
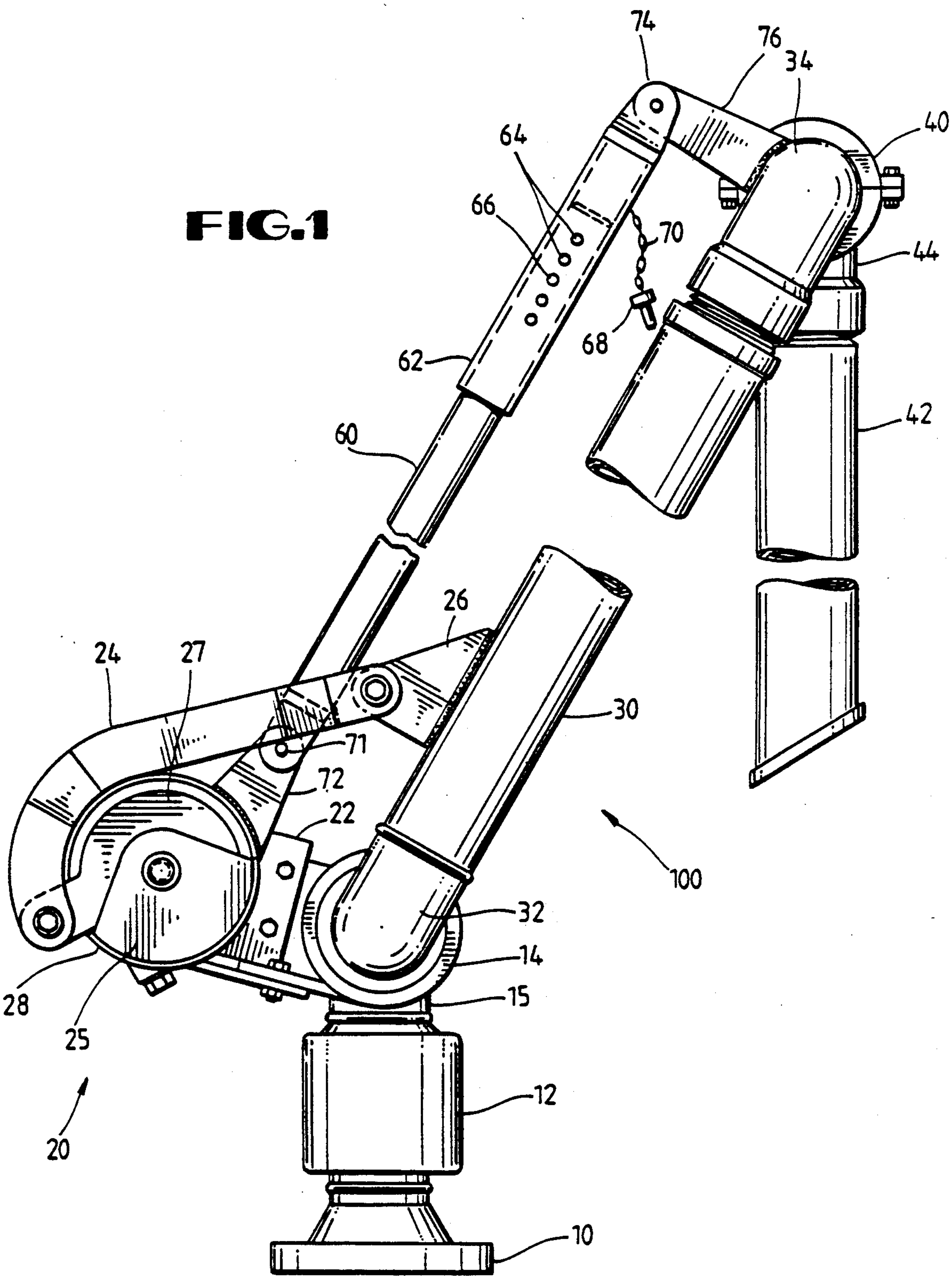
FIG. 1 is a side elevational view of an embodiment of the present invention when the loading arm is in a storage or idle position.

FIGS. 1-3 depict a preferred embodiment of the present invention. This embodiment contains a support structure that includes a riser flange, and horizontal and vertical swivel joints. An inboard (swivel) arm is attached to the vertical swivel joint of the support structure to enable it to move in horizontal and vertical planes. A spring assembly is connected to both the support structure and the inboard arm. One end of a lockable telescopic type lock-down device is pivotally attached to the spring assembly while the other end is fixedly attached to the inboard arm. Referring now to FIG. 1, this figure depicts an elevational view of a telescopic lock-down device connected to a spring-balanced loading arm when the loading arm is in the storage or idle position, i.e., when the loading arm is not being used for transferring material. The spring-balanced arms of the type shown in FIG. 1 are commonly used in the industry, particularly in the petroleum and chemical industry for transferring gasoline or liquid chemicals into trucks or tank cars. The spring-balanced loading arm shown here is more fully explained in U.S. Pat. No. 4,537,233, issued to Evart J. Vroonland et al. Another type of spring-balanced loading arm is shown in U.S. Pat. No. 3,244,440 issued to Albert A. Ashton et al.

Still referring to FIG. 1, it shows a loading arm 100 that contains a support structure, a spring assembly, an inboard arm, a drop tube and a lock-down device.

The support structure contains a horizontal swivel joint 12 which is connected to a vertical swivel joint 14 via an elbow member 15. The horizontal swivel joint 12 is also connected to a riser flange 10. The horizontal swivel joint 12 enables the support structure to rotate in a horizontal plane about the flange 10.

An inboard or swivel arm 30, which has an elbow 32 at one end (the riser end) and another elbow 34 at the other end (the apex or the port end), is pivotally connected to the vertical swivel joint 14. The elbow 34 of the inboard arm 30 terminates into a swivel joint 40.

A drop-tube 42 is pivotally connected to the swivel joint 40 via an elbow 44. The arrangement described thus far enables the inboard arm to move in both horizontal and vertical planes and also enables the drop-tube 42 to move along a plane which is parallel to the plane in which lies the inboard arm 30.

As shown in FIG. 3, a spring assembly or a spring support system 20 is connected to both the support structure and the inboard arm 30. It will be noted that a counterweight can easily be substituted for the spring assembly. When a counterweight is used to balance the loading arm, it is generally connected only to the inboard arm. The spring assembly 20 includes securing means 22 adapted to support the spring assembly either directly on the riser (not shown) or on the support structure (shown in FIG. 3). The spring assembly 20 also includes a housing 28 which is adapted to have a coil spring therein. A spring arm cap 25 is adapted to close one end of the housing 28. A spring extension element 27 is attached to the spring and a linkage arm 24. The linkage arm 24 in turn is adapted to connect and be affixed to attachment means 26 for attaching the spring assembly 20 to the inboard arm 30.

Thus, the loading arm of FIG. 1, wherein the inboard arm 30 is pivotally connected at one end (the riser end) to the support structure and at the other end (the port end) to a drop-tube 42, is capable of being moved and positioned in any desired position about the riser flange 10 both when the loading arm is used to transfer material and during storage. Thus, the loading arm 100 is capable of moving in a horizontal plane about the horizontal swivel joint 12 and in a vertical plane about the vertical swivel joint 14. Also, the drop-tube 42 is capable of moving about the port end of the inboard arm 30 in a plane which is parallel to the inboard arm.

Loading arms of the type described thus far are used to transfer materials into tank trucks and tank cars. Before describing the lock-down device of the present invention, it is considered helpful to understand how a loading arm operates without the use of such a device. To transfer the material into a tank car or truck, the loading arm is moved to a horizontal position as shown in FIG. 2. In this position, the coil spring of the spring assembly 20 provides a counterbalance force, i.e., the spring force, as shown by the arrow A which is counter to the direction of the movement of the inboard arm. The material flow during loading is shown by the direction of the arrows B. Furthermore, the jet action of the material flow also creates a force on the inboard arm counter to the direction of the material flow. Because of the counterbalance spring force and the jet action of the liquid being discharged from the drop-tube, the inboard arm 30 has a tendency to rise out of the truck or tank car loading port during loading operations. Various devices have been employed to prevent the arm from rising. These devices, which include friction and locking devices, are used to lock the inboard arm at or near the riser. Such devices require the loading arm operator — who normally operates at the port end of the inboard arm where the loading port of the tank car or truck is located — to move from his position at the loading port to the riser end to engage the locking device, which is inconvenient and time consuming.

The lock-down device of the present invention is an adjustable device that is locked in position near the port end. This device provides a positive lock-down of the inboard arm of the loading arm at the port end, is convenient to use, and is also relatively inexpensive to build. The lock-down device of the present invention will now be described in detail.

Referring now to FIG. 1, the lock-down device contains an inner tube 60 which is slidably enclosed at the port end in an outer tube 62. The inner tube 60 has a series of through holes 64 in the section which slides inside the outer tube 62. The outer tube 62 has at least one matching through hole 66, and a pin 68 is connected to the outer tube with a chain 70. The pin is adapted to be inserted into the hole 66 and the holes 64 so as to securely lock the inner tube in relation to the outer tube at a desired position or length. The riser end of the inner tube 60 is pivotally connected to the housing 28 of the spring assembly 20 or to the support structure by a lug 72. It will be noted that for the purpose of this invention, the riser end of the inner tube may be pivotally connected at any convenient place near the riser end of the inboard arm 30. The port end 74 of the outer tube 62 is fixedly attached or fastened to the elbow 34 of the inboard arm 30 via a lug 76. When a counterweight is used instead of the spring assembly, the lower end of the inner tube can easily be pivotally connected to the support structure.

During storage the loading arm is usually in the position shown in FIG. 1. In this position the pin 68 is generally not inserted so as to allow the movement of the inboard arm in the vertical plane. The overlap of the outer tube to the inner tube is made sufficiently long so that there remains a telescopic action (or an overlap) between the inner and the outer tubes. During loading operations the inboard arm 30 is lowered above the loading port of the tank car or a truck and the drop tube 42 is placed inside the loading port. The operator, who would be operating near the loading port, locks the inboard arm 30 by inserting the pin 68 in the hole 66 and a corresponding hole 64. This assures that during a loading operation the loading arm 100 is positively locked in the desired horizontal position. After the material has been transferred, the pin 68 is disengaged and the inboard arm 30 is slowly moved to the storage or idle position of FIG. 1.

Figure 4:
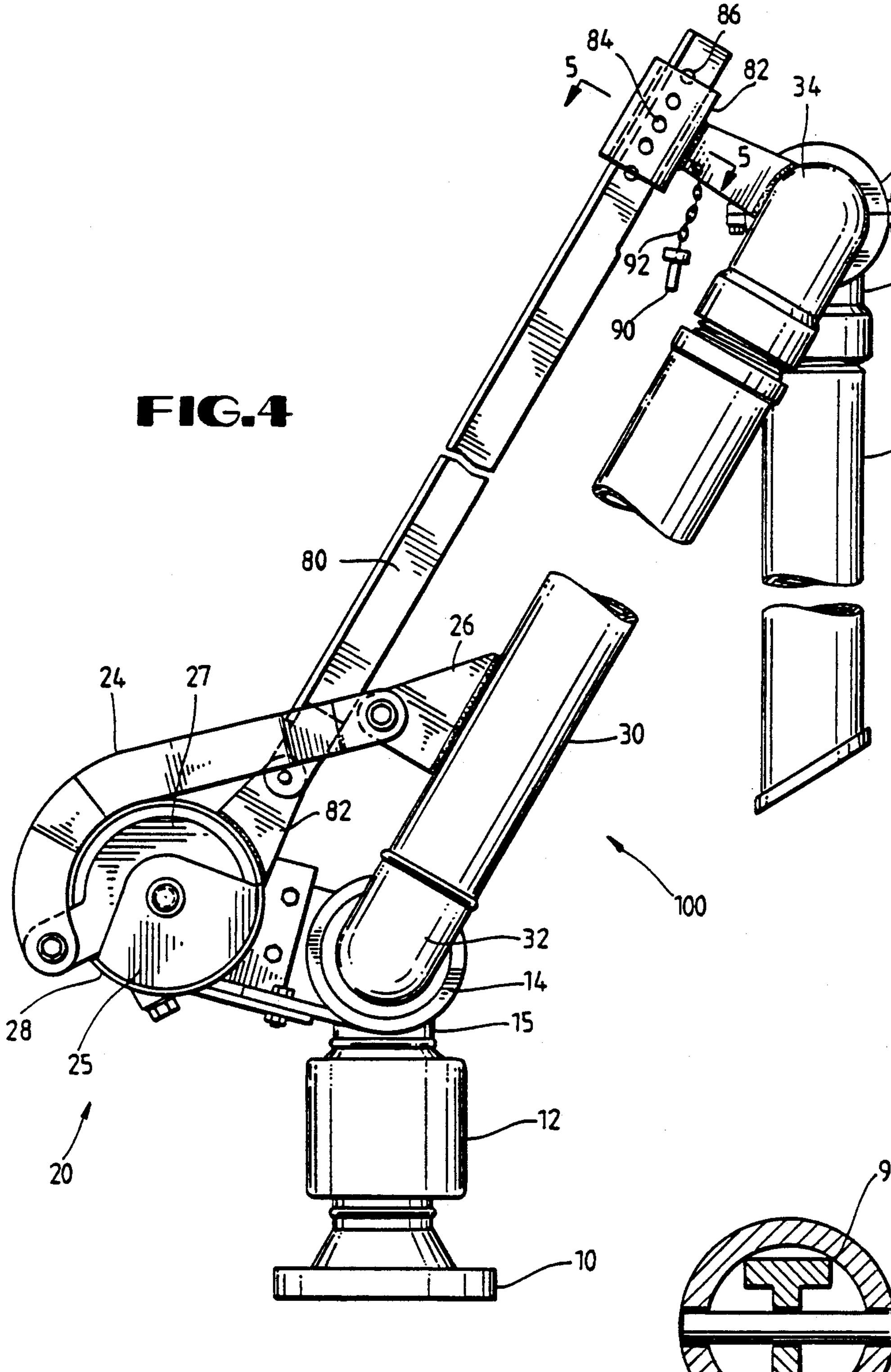
FIG. 4 is a side elevational view of an alternate embodiment of the present invention when the loading arm is in the storage or idle position.

FIG. 4 shows an alternate embodiment of the lock-own dévice of the present invention. This device contains a linkage arm 80, one end of which is pivotally connected to the spring housing 28 or to the support structure via a lug 88 and the other end is slidably placed into a guide member 82. The guide member 82 has at least one through hole 84. The linkage member 80 has a series of holes 86 so that when the linkage member 80 slides into the guide member 82 the holes 86 align with the hole 84. A pin 90 is adapted to lock the linkage arm into the guide member at a desired position or length. When a counterweight is used instead of the spring assembly, the pivot end of the linkage arm is generally connected to the support structure.

Figure 5:
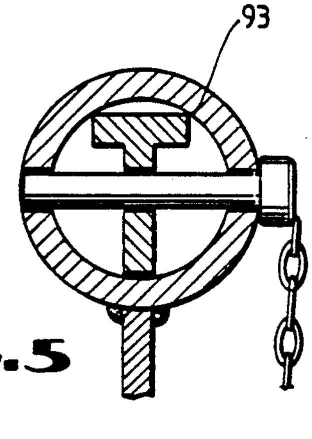
FIG. 5 is a cross-sectional view taken along 5—5 of FIG. 4.

FIG. 5 shows the cross-section of the lock-down device of FIG. 4 taken along 5—5. Although it is not always necessary, but for structural support, a tee type linkage 93 was used for structural support in this configuration.

Although only two embodiments of the lock-down device of the present invention have been described, a variety of alternative embodiments could be provided from the designs described herein and the invention could be applied to a variety of equipment and uses, particularly where there is a need to positively lock in position material handling systems. Various improvements, modifications and alternative applications and usages will be readily apparent to those of ordinary skill in the art. Accordingly, the scope of the instant invention should be considered in terms of the following claims and it is not to be limited to the details of the embodiments and the structures and operations shown in the specification and drawings.

What is claimed is:

1. A loading arm, comprising:

(a) a support structure;

(b) a swivel arm having a riser end and a port end, the riser end o the swivel arm being pivotally attached to the support structure for swivel movement in horizontal and vertical planes relative to the support structure;

(c) a spring assembly attached to the swivel arm and to the support structure to balance the swivel arm; and (d) a telescopic type lock-down device comprising:

(i) an inner tube having a lower end and an upper end, the lower end of the inner tube being pivotally attached to the spring assembly, and the upper end of the inner tube having a series of through holes therein;

(ii) an outer tube having a port end and an open end, the open end of the outer tube slidably containing the upper end of the inner tube to form a telescopic arrangement, the port end of the outer tube being pivotally attached to the port end of the swivel arm, and the outer tube having at least one through hole aligned with the series of through holes in the inner tube; and (iii) a lock-pin adapted to be inserted into the holes of the inner and outer tubes so as to positively lock the lock-down device at a desired length.

2. A loading arm, comprising:

(a) a supporting structure adapted to swivel in a horizontal plane;

(b) a swivel arm having a riser end and a port end, the swivel arm being pivotally attached to the support structure for swivel movement in vertical planes whereby the swivel arm is free to swivel both in the horizontal and vertical planes;

(c) a spring structure attached to the support structure and to the swivel arm and being adapted for balancing the swivel arm for movement in the vertical planes;

(d) a lock-down device comprising:

(i) an inner tube having a riser end and an upper end, the riser end of the inner tube being pivotally connected to the spring structure, and the upper end of the inner tube having a series of through holes therein;

(ii) an outer tube adapted for slidably housing the inner tube, the outer tube having an open end of an upper end, the upper end being pivotally attached to the port end of the swivel arm and the open end being adapted to slidably receive the inner tube therein so that the inner and outer tubes form a telescopic arrangement, the outer tube having at least one through hole positioned to generally align with the series of through holes in the inner tube; and (iii) a lock-pin adapted to be inserted into the through holes of the inner and outer tubes to lock together the inner and outer tubes at a desired length; and (e) a drop-tube pivotally connected to the port end of the swivel arm and adapted for allowing movement of the drop-tube in vertical planes.

3. A loading arm, comprising:

(a) a support structure;

(b) a swivel arm having a riser end and a port end, the riser end of the swivel arm being pivotally attached to the support structure for swivel movement in the horizontal and vertical planes relative to the support structure;

(c) a spring balance assembly attached to the swivel arm and to the support structure to balance the swivel arm;

(d) a lock-down device comprising:

a linkage arm having a lower and an upper end, the lower end of the linkage arm being pivotally connected to the support structure, and the upper end of the linkage arm having a plurality of through holes therein, a guide member fixedly attached to the port end of the swivel arm and adapted for slidably receiving the upper end of the linkage arm, the guide member having at least one through hole generally aligned with the plurality of linkage arm through holes, and a lock-in adapted to lock the linkage arm into the guide member at a desired hole location of the linkage arm.

4. A loading arm, as set forth in 3, wherein the linkage arm has a generally tee shaped cross sectional configuration.

5. A method of transferring material into a container utilizing a loading arm which includes a swivel arm having a riser and a sport end, a support structure pivotally attached to the riser end of said swivel arm whereby the swivel arm is free to move in a plurality of horizontal and vertical planes, and an extendable lock-down device including a linkage arm having a lower and an upper end, the lower end of the linkage arm being pivotally connected to the support structure, and the upper end of the linkage arm having a plurality of holes extending therethrough, a guide member attached to the port end of the swivel arm and adapted for slidably receiving the upper end of the linkage arm, the guide member having at least one hole extending therethrough and generally aligned with the plurality of linkage arm holes, and a lock-pin adapted to lock the linkage arm into the guide member at a desired hole location of the linkage arm, said method comprising the steps of:

(a) moving the swivel arm through the vertical and horizontal planes to position the port end of the swivel arm adjacent an opening in the container, whereby material is free to flow from the port end of said swivel arm into said container;

(b) aligning one of said linkage arm holes with said guide member holes;

(c) inserting the lock pin through said aligned holes to restrict movement of the swivel arm in the vertical direction; and (d) transferring the material into the container.

6. A loading arm, comprising:

(a) a support structure;

(b) a swivel arm having a riser end and a port end, the riser end of the swivel arm being pivotally attached to the support structure for swivel movement in first and second planes relative to the support structure;

(c) means for balancing the swivel arm in the second planes of movement; and (d) a telescopic type lock-down device including:

(i) an inner tube having a lower end and an upper end, the lower end of the inner tube being pivotally attached to the support structure, and the upper end of the inner tube having a series of holes extending therethrough;

(ii) an outer tube having a port end and an open end, the open end of the outer tube slidably containing the upper end of the inner tube to form a telescopic arrangement, the port end of the outer tube being pivotally attached to the port end of the swivel arm, and the outer tube having at least one hole extending therethrough in general alignment with the series of holes in the inner tube; and (iii) a lock-in added to for being inserted into the holes of the inner and outer tubes so as to positively lock the lock-down device at a desired length.

7. A loading arm, as set forth in claim 6, wherein said balancing means includes a spring assembly attached to the swivel arm and to the support structure.

8. A loading arm, as set forth in claim 6, wherein said balancing means includes a counterweight attached to the riser end of the swivel arm and adapted for balancing the swivel arm in the second planes of movement.

9. A loading arm, comprising:

(a) a support structure adapted to a swivel in a first plane;

(b) a swivel arm having a riser end and a port end, the swivel arm being pivotally attached to the support to the support structure for swivel movement in a plurality of second planes;

(c) means for balancing the swivel arm in one of the first and second planes of movement;

(d) a telescopic type lock-down device including:

(i) an inner tube having a riser end and an upper end, the riser end of the inner tube being pivotally connected to the support structure, and the upper end of the inner tube having a series of through holes therein;

(ii) an outer tube adapted to slidably house the inner tube, the outer tube having an open end and an upper end, the upper end being pivotally attached to the port end of the swivel arm and the open end being adapted to slidably receive the inner tube therein so that the inner and outer tubes form a telescopic arrangement, the outer tube also having at least one through hole positioned to generally align with the series of through holes in the inner tube; and (iii) a lock-in adapted to be inserted into the through holes of the inner and outer tubes to lock together the inner and outer tubes at a desired length; and (e) a drop-tube pivotally connected to the port end of the swivel arm and adapted for movement in a plurality of third planes.

10. A loading arm, as set forth in claim 9, wherein said balancing means includes a spring assembly attached to the swivel arm and to the support structure.

11. A loading arm, as set forth in claim 9, wherein said balancing means includes a counterweight attached to the riser end of the swivel arm and adapted for balancing the swivel arm in one of the first and second planes of movement.

12. A loading arm, comprising:

(a) a support structure;

(b) a swivel arm having a riser end and a port end, the riser end of the swivel arm being pivotally attached to the support structure for swivel movement in first and second planes relative to the support structure;

(c) means for balancing the swivel arm in one of the first and second planes of movement; and (d) a lock-down device including:

a linkage arm having a lower and an upper end, the lower end of the linkage arm being pivotally connected to the support structure, and the lower end of the linkage arm having a plurality of holes extending therethrough;

a guide member attached to the port end of the swivel arm and adapted for slidably receiving the upper end of the linkage arm, the guide member having at least one hole extending therethrough in general alignment with the plurality of linkage arm holes; and a lock-pin adapted to lock the linkage arm into the guide member at a desired hole location of the linkage arm.

13. A loading arm, as set forth in claim 12, wherein the linkage arm has a generally tee shaped cross sectional configuration.

14. A loading arm, as set forth in claim 12, wherein said balancing means includes a spring assembly attached to the swivel arm and to the support structure.

15. A loading arm, as set forth in claim 12, wherein said balancing means includes a counterweight attached to the riser end of the swivel arm and adapted for balancing the swivel arm in one of the first and second planes of movement.

16. A loading arm, as set forth in claim 12 including a drop-tube pivotally connected to the port end of the swivel arm and adapted for movement of the drop-tube in a plurality of third planes.

* * * * *

UNITED STATES PATENT AND TRADEMARK OFFICE
CERTIFICATE OF CORRECTION

PATENT NO. : 4,987,925

DATED : January 29, 1991

INVENTOR(S) : Evart J. Vroonland

It is certified that error appears in the above-identified patent and that said Letters Patent is hereby corrected as shown below:

Column 4, line 65, delete --o-- and substitute "of" therefore;

Column 6, line 10, delete --in-- and substitute "pin" therefore;

Column 7, line 3, delete --in-- and substitute "pin" therefore; and

Column 7, line 41 delete --in-- and substitute "pin" therefore.

UNITED STATES PATENT AND TRADEMARK OFFICE

CERTIFICATE OF CORRECTION

PATENT NO. : 4,987,925

DATED : January 29, 1991

INVENTOR(S) : Evart J. Vroonland

It is certified that error appears in the above-identified patent and that said Letters Patent is hereby corrected as shown below:

Column 5, claim 2, line 40 delete "of" and substitute --and-- therefore.

Column 6, claim 4, line 13, insert --claim-- before "3".

Signed and Sealed this

Ninth Day of June, 1992

*Attest:*

DOUGLAS B. COMER

*Attesting Officer*

*Acting Commissioner of Patents and Trademarks*